(12) United States Patent
Chang

(10) Patent No.: US 7,236,806 B2
(45) Date of Patent: Jun. 26, 2007

(54) BASEBAND CARD ARCHITECTURE FOR A BASE TRANSCEIVER STATION

(75) Inventor: Chin-Hao Chang, Tainan Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 711 days.

(21) Appl. No.: 10/708,600

(22) Filed: Mar. 14, 2004

(65) Prior Publication Data
US 2005/0202848 A1  Sep. 15, 2005

(51) Int. Cl.
*H04B 1/38* (2006.01)
(52) U.S. Cl. .......................... 455/561; 455/73
(58) Field of Classification Search ........... 455/73–88, 455/553.1, 561
See application file for complete search history.

(56) References Cited

U.S. PATENT DOCUMENTS 6,272,322 B1 *  8/2001  Su ........................ 455/67.14
6,845,126 B2 *  1/2005  Dent et al. ................ 375/219
7,031,668 B2 *  4/2006  Darabi et al. ............... 455/75
7,181,168 B2 *  2/2007  Grant et al. ............. 455/67.11

* cited by examiner

*Primary Examiner*—Edward F. Urban
*Assistant Examiner*—Raymond S. Dean
(74) *Attorney, Agent, or Firm*—Winston Hsu

(57) ABSTRACT

A baseband card for a base transceiver station of a cellular communications network includes a receive unit containing at least one receive module for receiving an uplink data from an RF signal processing unit and a first interface for sending and receiving data. The baseband card also includes a transmit unit containing a second interface for communicating with the receive unit, a third interface for communicating with the cellular communications network, an interface controller for receiving the uplink data from the receive unit via the first and second interfaces and for transmitting the uplink data to the cellular communications network via the third interface, and at least one transmit module for transmitting a downlink data received from the cellular communications network through the third interface and the interface controller to the RF signal processing unit.

20 Claims, 4 Drawing Sheets

BASEBAND CARD ARCHITECTURE FOR A BASE TRANSCEIVER STATION

BACKGROUND OF INVENTION

1. Field of the Invention

The present invention relates to a base transceiver station, and more specifically, to a baseband hardware architecture for a WCDMA base-station.

2. Description of the Prior Art

Please refer to FIG. 1. FIG. 1 is a block diagram of a base-station 10 according to the prior art. The base-station 10 can be a wideband code division multiple access (WCDMA) base-station for a cellular communications network. Up-link data (data transmitted from a mobile phone to the cellular communications network) is received through an RF module 18, and sent to upper layers 12 through a receive unit 16. Downlink data (data transmitted from the cellular communications network to the mobile phone) is sent from the upper layers 12, through a transmit unit 14, and out through the RF module 18. Each of the transmit unit 14 and the receive unit 16 has its own timing unit, which makes it harder for the timing of the transmit unit 14 to by synchronized with the timing of the receive unit 16.

When uplink data from a mobile phone is received through the receive unit 16, the receive unit 16 calculates signal-to-interface ratio measurement (SIRM) values for the uplink data. The SIRM values are then sent to the upper layers 12, and the upper layers 12 determine if the SIRM values are satisfactory. If the strength of the uplink data needs to be altered, the upper layers 12 will send a command to the mobile phone via the transmit unit 14 for informing the mobile phone to adjust the uplink transmission signal strength. On the other hand, the mobile phone can also issue requests to the base-station 10 that the base-station 10 downlink transmission signal strength needs to be adjusted. The requests are sent to the upper layers 12 of the base-station 10 via the receive unit 16. The upper layers 12 will then command the transmit unit 14 to adjust the transmission signal strength. It is necessary to access the upper layers 12 of the base-station 10 for adjusting both the uplink and downlink signal strength. Accessing the upper layers 12 extends the reaction time to adjust signal strength, and lowers the efficiency of the base-station 10.

SUMMARY OF INVENTION

It is therefore an objective of the claimed invention to provide a baseband card for a base transceiver station (BTS) of a cellular communications network in order to solve the above-mentioned problems.

According to the claimed invention, a baseband card for a base transceiver station of a cellular communications network includes a receive unit containing at least one receive module for receiving an uplink data from an RF signal processing unit and a first interface for sending and receiving data. The baseband card also includes a transmit unit containing a second interface for communicating with the receive unit, a third interface for communicating with the cellular communications network, an interface controller for receiving the uplink data from the receive unit via the first and second interfaces and for transmitting the uplink data to the cellular communications network via the third interface, and at least one transmit module for transmitting a downlink data received from the cellular communications network through the third interface and the interface controller to the RF signal processing unit. The receive unit is serially connected to the transmit unit, and the transmit unit is serially connected to cellular communications network.

It is an advantage of the claimed invention that the receive unit is serially connected to the transmit unit for allowing uplink and downlink transmission signal strength levels to be adjusted without needing to access the upper layers.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
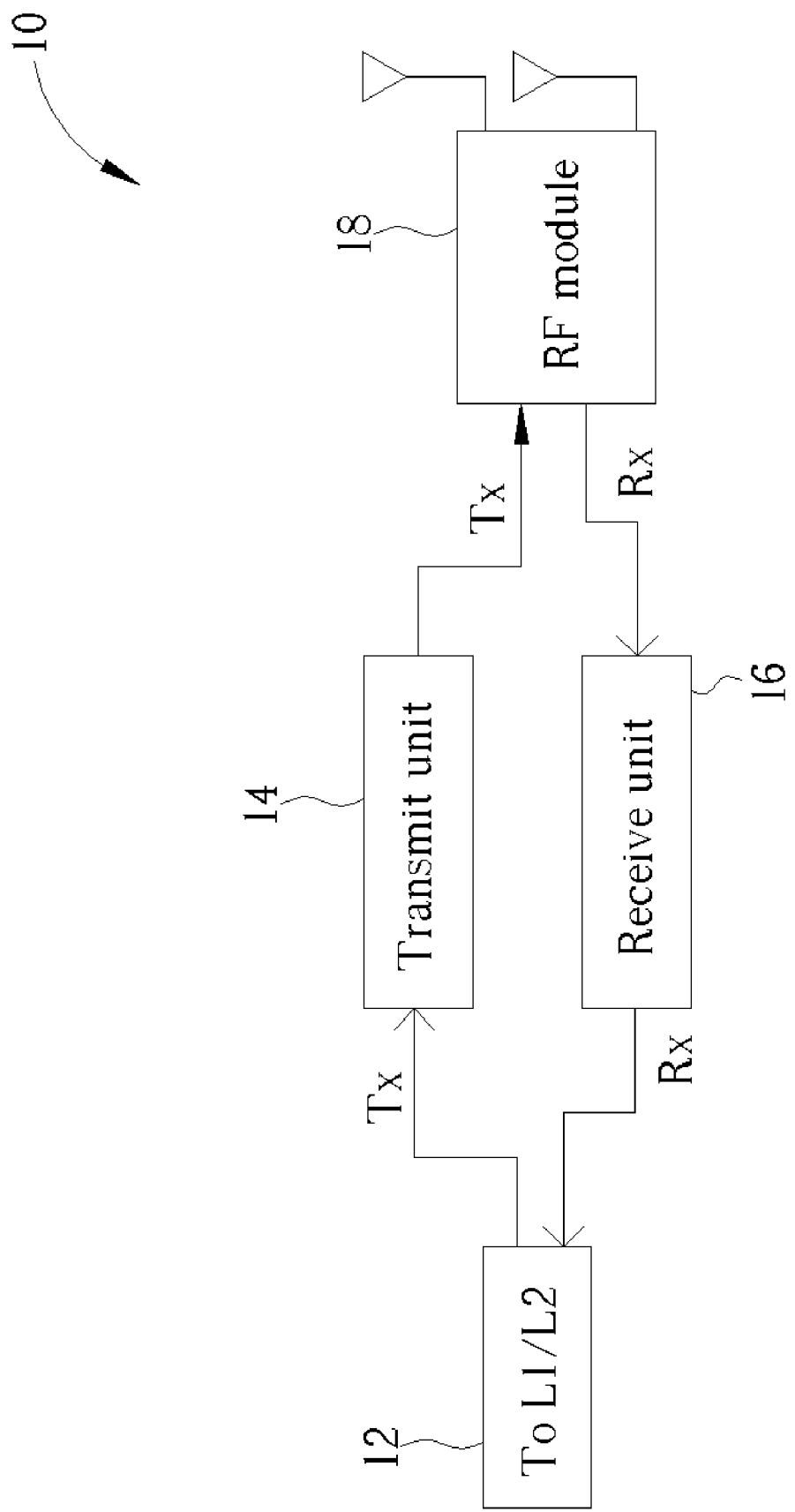
FIG. 1 is a block diagram of a base-station according to the prior art.
Figure 2:
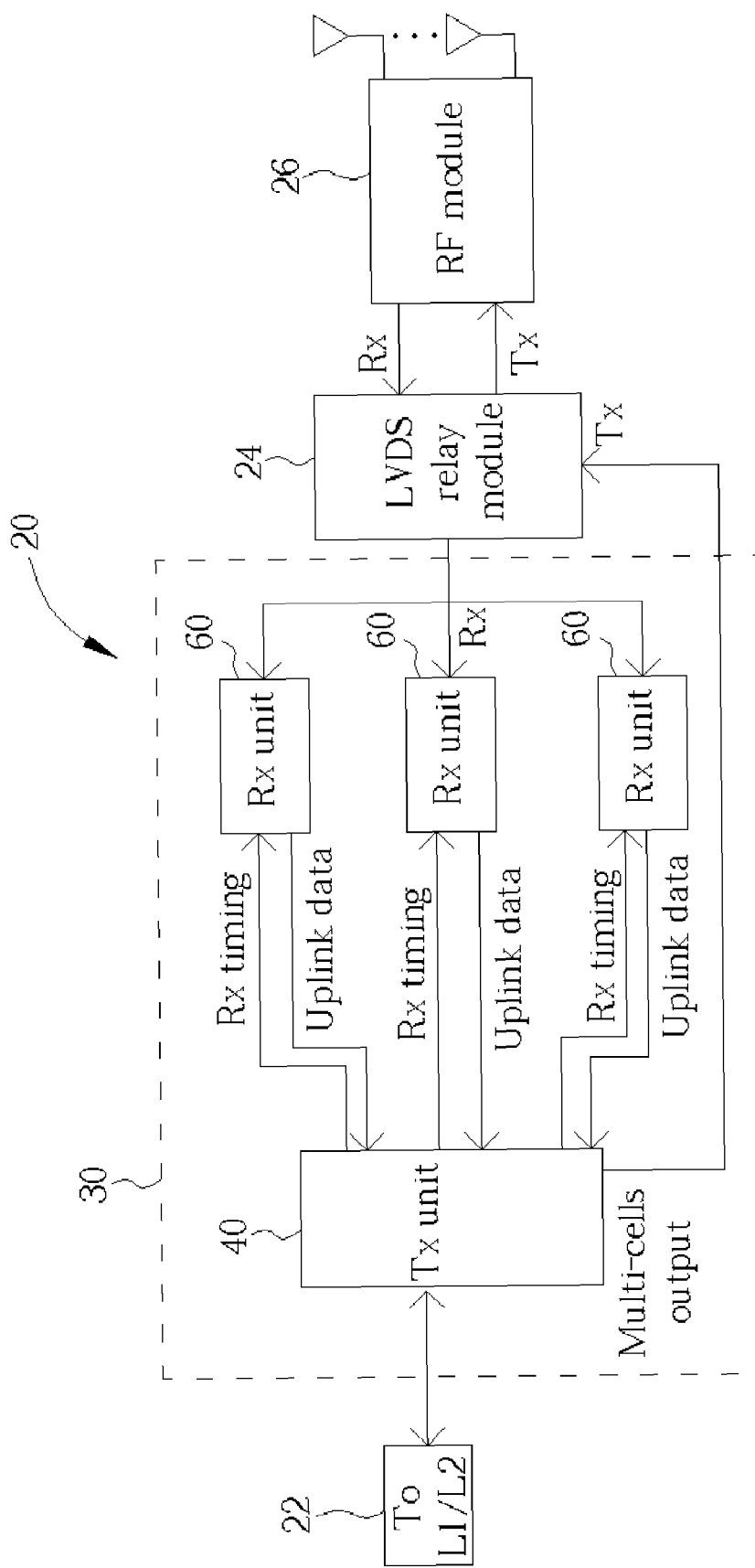
FIG. 2 is a block diagram of a base-station according to the present invention.

Please refer to FIG. 2. FIG. 2 is a block diagram of a base-station 20 according to the present invention. The base-station 20 contains a baseband card 30 acting as a transceiver module. A distinguishing feature of the present invention is that the baseband card 30 contains a transmit unit 40 and one or more receive units 60 serially connected to the transmit unit 40. Although three receive units 60 are shown, any number of receive units 60 may be used with the present invention. The transmit unit 40 of the baseband card 30 communicates directly with upper layers (layers L1 and L2) 22 of the base-station 20 and is connected serially to the upper layers 22. All downlink data (data transmitted from the cellular communications network to the mobile phone) is sent directly from the transmit unit 40 to a low voltage differential signaling (LVDS) relay module 24, which then sends the downlink data to an RF module 26 for transmission to a mobile phone using the base-station 20. The LVDS relay module 24 is used to transmit data at high speeds, and can also be replaced by other similar devices. Uplink data (data transmitted from a mobile phone to the cellular communications network) is received through the RF module 26 and then sent to the LVDS relay module 24. The uplink data is then sent to the receive unit 60. Uplink data from the receive unit 60 is sent to the transmit unit 40 before being sent to the upper layers 22. Please note that unlike the prior art base-station 10, the receive unit 60 is not directly connected to the upper layers 22, but instead are connected to the transmit unit 40, which is in turn connected to the upper layers 22. This topology greatly simplifies the communication between the baseband card 30 and the upper layers 22 since the receive unit 60 does not directly communicate with the upper layers 22.

As will be explained in greater detail below, the timing of both the transmit unit 40 and the receive unit 60 is controlled by the transmit unit 40. This simplifies the synchronization of the baseband card 30 and reduces the burden placed on the receive unit 60. In addition, the transmit unit 40 and the receive unit 60 are able to process data corresponding to multiple cells of a cellular communications network.

Figure 3:
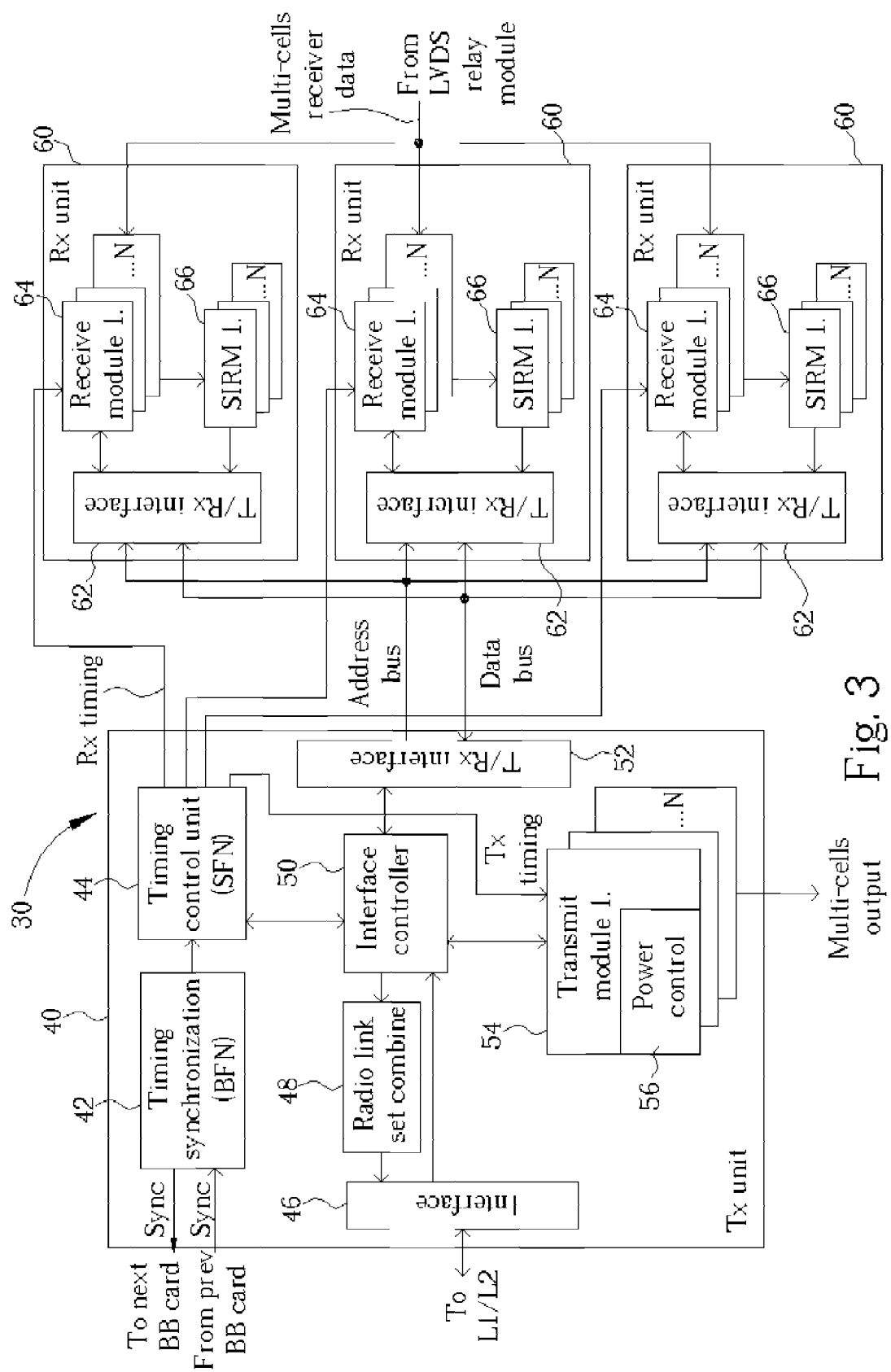
FIG. 3 is a detailed block diagram of the baseband card according to the present invention.

Please refer to FIG. 3. FIG. 3 is a detailed block diagram of the baseband card 30 according to the present invention.

The LVDS relay module 24 sends uplink data for multiple cells of the cellular communications network to the receive unit 60. The receive unit 60 is mainly used for receiving uplink data; specifically, the receive unit 60 contains at least one receive module 64. Each receive module 64 is capable of receiving uplink data corresponding to one cell of the cellular communications network. The receive unit 60 also contains at least one signal-to-interface ratio measurement (SIRM) circuit 66 for measuring SIRM values of the uplink data received by the receive unit 60. Each of the receive modules 64 has a corresponding SIRM circuit 66. Both the uplink data and the corresponding SIRM values are sent to a first interface 62, a transmit/receive interface, of the receive unit 60. The uplink data and SIRM values are then sent to a second interface 52, a transmit/receive interface, of the transmit unit 40. All uplink data is sent through the second interface 52 to an interface controller 50 of the transmit unit 40, which is used to arbitrate all data packets received by the transmit unit 40.

All downlink data is sent from the transmit unit 40 to the LVDS relay module 24. More specifically, as with the receive modules 64, the transmit unit 40 contains at least one transmit module 54 to transmit downlink data corresponding to one cell of the cellular communications network. Each of the transmit modules 54 contains a power control circuit 56 used for controlling transmission signal strength of downlink data. When one of the mobile phones in the cellular communications network determines that the downlink signal strength coming from the base-station 20 is not satisfactory, the mobile phone sends a request to the base-station 20 to adjust the downlink signal strength. This request is received by one of the receive modules 64, passed to the interface controller 50 of the transmit unit 40, and then sent to the power control circuit 56. Based on the request issued by the mobile phone, the power control circuit 56 will then adjust the strength of the downlink signal sent to the mobile phone.

Similarly, the SIRM circuits 66 will measure the uplink signal strength and send this information to the power control circuit 56. The power control circuit 56 will compare the SIRM values to target values to make a determination. If the uplink signal strength is not satisfactory, the power control circuit 56 will send a command to the corresponding mobile phone instructing the mobile phone to adjust the strength of its transmission signals. Therefore, in both of these cases downlink and uplink signal strength levels can be adjusted using the power control circuit 56 of the transmit unit 40. Therefore, for the power control circuit, no communication with the upper layers 22 is necessary, reducing the power control reaction time considerably.

When uplink data is received by the interface controller 50 of the transmit unit 40, the interface controller 50 sends the uplink data to a radio link set combine unit 48. The radio link set combine unit 48 combines uplink data received from two or more different cells corresponding to a single user. The combined uplink data is then sent to the upper layers 22 through a third interface 46, which is used as an interface between the upper layers 22 and the transmit unit 40.

The transmit unit 40 also contains a timing synchronization unit 42 that generates Node B frame numbers (BFNs) for synchronizing other baseband cards used in the base-station 20. The timing synchronization unit 42 sends synchronization signals to a next baseband card 30 and receives synchronization signals from a previous baseband card 30 for synchronizing all baseband cards 30 in the base-station 20. Based on the BFNs generated by the timing synchronization unit 42, a timing control unit 44 of the transmit unit 40 generates system frame numbers (SFNs) utilized for controlling the timing of the transmit modules 54 and the receive modules 64 in the receive unit 60. The timing control unit 44 generates the SFNs based on the BFNs received from the timing synchronization unit 42 and an offset specified in the upper layers 22. The same SFNs are used for each cell in the cellular communications network. Therefore, since the timing control unit 44 controls the timing of the receive modules 64, the receive unit 60 does not need to implement a timing generator or controller. This design simplifies the design of the receive unit 60.

Figure 4:
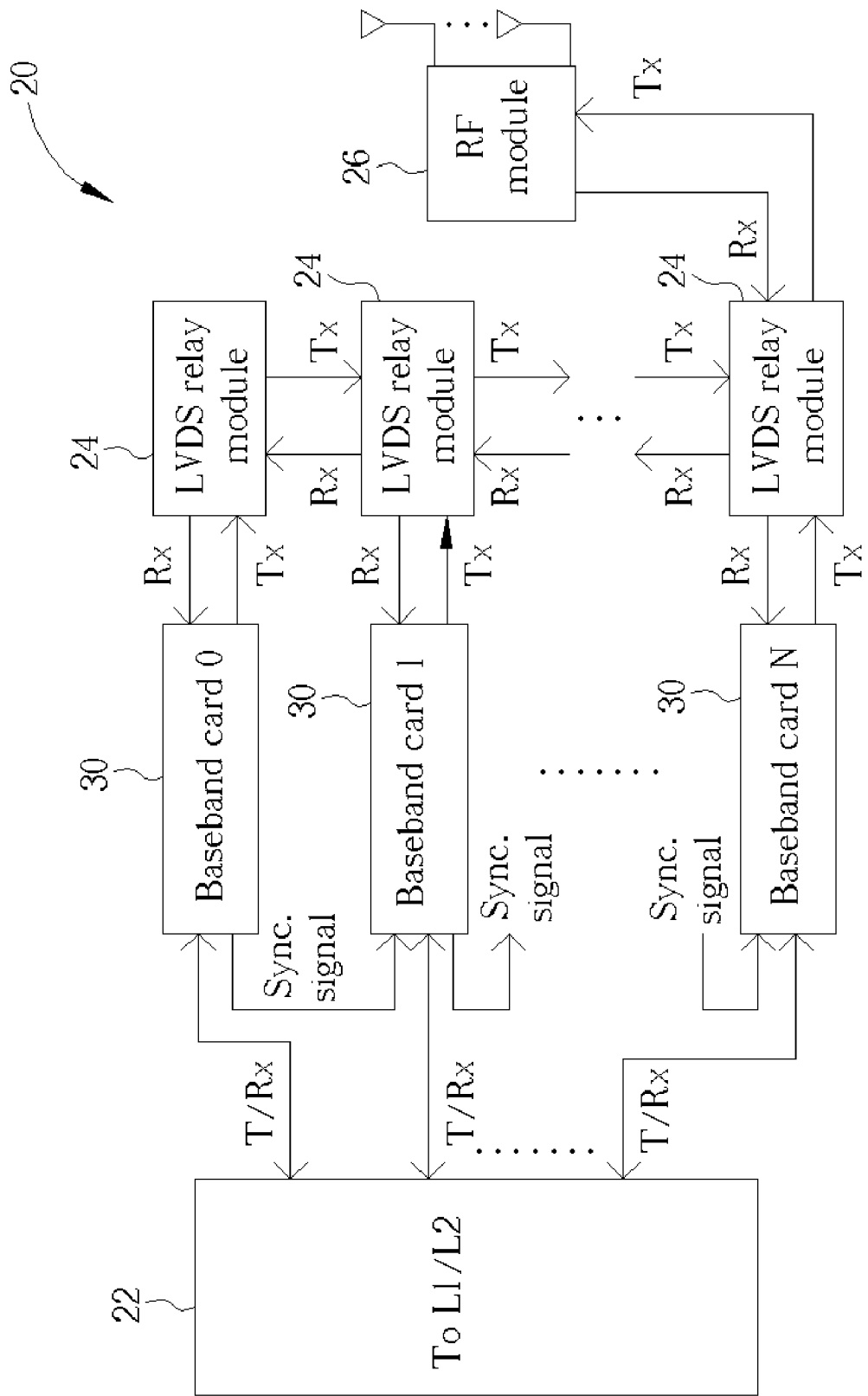
FIG. 4 is a diagram illustrating multiple baseband cards utilized in the base-station according to the present invention.

Please refer to FIG. 4. FIG. 4 is a diagram illustrating multiple baseband cards 30 utilized in the base-station 20 according to the present invention. Each baseband card 30 is connected to the upper layers 22 for receiving downlink data and for transmitting uplink data. The first baseband card 30 (labeled Baseband Card 0 in FIG. 4) controls the synchronization of all other baseband cards 30 in the base-station 20. A synchronization signal is sent to the next baseband card 30 and received from the previous baseband card 30 to synchronize all baseband cards 30. Each baseband card 30 is connected to a corresponding LVDS relay module 24, and at least one of the LVDS relay modules 24 is connected to the RF module 26. In addition, each LVDS relay module 24 is connected to previous and next LVDS relay modules 24 for allowing data to be sent to any of the baseband cards 30 in the base-station 20.

The ability to use multiple baseband cards 30 offers great flexibility to operators of the base-station 20. If greater capacity is needed, all that has to be done is to add another baseband card 30, to synchronize the new baseband card 30 with the previous baseband card 30, and to connect the baseband card 30 to the LVDS relay module 24. Since all the baseband cards 30 are the same, mass production of the baseband cards 30 will lower the cost for each baseband card 30. Furthermore, increasing capacity by installing additional baseband cards 30 will be very simple since technicians will quickly become familiar with the baseband cards 30.

In contrast to the prior art, the baseband card 30 of the present invention contains at least one receive unit 60 connected to the one transmit unit 40. The transmit unit 40 and the receive unit 60 communicate with the upper layers 22 through the same interface, that is, the third interface 46. Timing of the entire baseband card 30 is controlled by the transmit unit 40, eliminating the need for receive unit to have a timing control circuit. In addition, multiple baseband cards 30 can easily be added to the base-station 20 for adding capacity to the base-station 20.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A baseband card for a base transceiver station of a cellular communications network, comprising:
   a receive unit comprising:
      at least one receive module for receiving an uplink data from an RF signal processing unit; and
      a first interface for sending and receiving data; and
   a transmit unit comprising:
      a second interface for communicating with the receive unit;
      a third interface for communicating with the cellular communications network;
      an interface controller for receiving the uplink data from the receive unit via the first and second interfaces and for transmitting the uplink data to the cellular communications network via the third interface; and at least one transmit module for transmitting a downlink data received from the cellular communications network through the third interface and the interface controller to the RF signal processing unit;

wherein the receive unit is serially connected to the transmit unit, and the transmit unit is serially connected to cellular communications network.

2. The baseband card of claim 1 wherein the receive unit further comprises a signal-to-interface ratio measurement (SIRM) circuit for measuring the SIRM signal quality of the uplink data and the transmit module of the transmit unit comprises a transmission power control circuit for processing power control with a mobile device according to the SIRM value.

3. The baseband card of claim 1 wherein the transmit unit further comprises a timing control unit for controlling timing of communications among the transmit unit, the receive unit, and the cellular communications network.

4. The baseband card of claim 3 wherein the timing control unit generates system frame numbers (SFNs) utilized for controlling the timing of the receive module in the receive unit and for controlling timing of the transmit module.

5. The baseband card of claim 4 wherein the transmit unit further comprises a timing synchronization unit for synchronizing multiple baseband cards used in the cellular communications network.

6. The baseband card of claim 5 wherein the timing synchronization unit generates Node B frame numbers (BFNs) for synchronizing the baseband cards in the cellular communications network, and the timing control unit generates the SFNs based on the BFNs received from the timing synchronization unit and cell parameters specified by the cellular communications network.

7. The baseband card of claim 6 wherein the SFNs are offset from the BFNs by an offset determined by the cell parameters specified by the cellular communications network.

8. The baseband card of claim 1 wherein the transmit unit further comprises a radio link set combine unit for combining uplink data received from two or more different cells for a single user.

9. The baseband card of claim 1 wherein the receive unit comprises a plurality of receive modules and the transmit unit comprises a plurality of transmit modules, each receive module and transmit module corresponding to different cells in the cellular communications network.

10. The baseband card of claim 1 wherein a low voltage differential signaling (LVDS) device is connected between the RF signal processing unit and the baseband card for transmitting the uplink data from the RF signal processing unit to the receive unit and for transmitting the downlink data from the transmit unit to the RF signal processing unit.

11. A baseband card for a base transceiver station of a cellular communications network, the base transceiver station capable of communicating with a mobile device, the baseband card comprising:

a receive unit for receiving an uplink data from an RF signal processing unit, the receive unit comprising a first interface; and a transmit unit for transmitting a downlink data to the RF signal processing unit, the transmit unit comprising:

a second interface for communicating directly with the receive unit through the first interface; and a third interface for communicating with the cellular communications network; an interface controller for receiving the uplink data from the receive unit via the first and second interfaces and for transmitting the uplink data to the cellular communications network via the third interface; wherein the receive unit is serially connected to the transmit unit.

12. The baseband card of claim 11 wherein the transmit unit further comprises an interface controller for controlling different data to flow via the second or via the third interface.

13. The baseband card of claim 11 wherein the receive unit further comprises a signal-to-interface ratio measurement (SIRM) circuit for measuring a signal quality of the uplink data and the transmit unit comprises a transmission power control circuit for processing power control with the mobile device according to the SIRM value.

14. The baseband card of claim 13 wherein the SIRM value is sent from the receive unit to the transmit unit directly, the power control circuit comparing the SIRM value to a reference value.

15. The baseband card of claim 11 wherein the transmit unit further comprises a timing control unit for controlling timing of communications among the transmit unit, the receive unit, and the cellular communications network.

16. A method of communicating using a baseband card in a base station of a cellular communications network, the baseband card comprising a transmit unit and a receive unit, the method comprising:

connecting the transmit unit with the receive unit serially;

the receive unit receiving an uplink data;

the receive unit passing the uplink data to the transmit unit; and sending the uplink data to the cellular communications network by the transmit unit.

17. The method of claim 16 further comprising:

controlling different data to flow between the receive unit and the transmit unit, and between the transmit unit and the cellular communications network.

18. The method of claim 16 further comprising:

the receive unit sending a signaltointerface ratio measurement (SIRM) value for measuring a signal quality of the uplink data; and the transmit unit commanding a mobile device to control power according to the SIRM value.

19. The method of claim 16 further comprising: the transmit unit controlling timing of communications among the transmit unit, the receive unit, and the cellular communications network.

20. The method of claim 16 further comprising:

connecting a plurality of the baseband cards;

the transmit unit generating a Node B frame number (BFN); and synchronizing timing of the plurality of the baseband cards according to the BFN.

* * * * *